United States Patent [19]
Kahkipuro

[11] Patent Number: 5,194,797
[45] Date of Patent: Mar. 16, 1993

[54] PROCEDURE FOR THE REGULATION OF AN ASYNCHRONOUS MOTOR

[75] Inventor: Matti Kahkipuro, Hyvinkaa, Finland

[73] Assignees: Kone Elevator GmbH, Baar, Switzerland; Montgomery Elevator Company, Moline, Ill.

[21] Appl. No.: 712,832

[22] Filed: Jun. 10, 1991

[30] Foreign Application Priority Data

Jun. 12, 1990 [FI] Finland ................ 902932

[51] Int. Cl.$^5$ ............................................ H02P 5/40
[52] U.S. Cl. .................................. 318/727; 318/803; 318/800
[58] Field of Search ............... 318/803, 805, 807, 609, 318/610, 789–823, 727–735

[56] References Cited

U.S. PATENT DOCUMENTS

| | | | |
|---|---|---|---|
| 4,677,360 | 6/1987 | Garces | 318/803 |
| 4,707,651 | 11/1987 | Schauder | |
| 5,010,288 | 4/1991 | Poline | 318/803 |

FOREIGN PATENT DOCUMENTS 388845 3/1990 European Pat. Off.
3528887 2/1987 Fed. Rep. of Germany.

OTHER PUBLICATIONS

Bose, B. K., "Adjustable Speed AC Drives–A Technology Status Review", Proc. of IEEE, vol. 70, No. 2, Feb. 1982, pp. 116, 128–131.

*Primary Examiner*—Paul Ip
*Attorney, Agent, or Firm*—Sughrue, Mion, Zinn, Macpeak and Seas

[57] ABSTRACT

Procedure for regulating the stator flux and torque of an asynchronous motor by vector control in an imaginary space vector coordinate system, in which procedure the absolute value ($|\Psi_s|$) of the stator flux and the torque (M) are determined in said coordinate system, and in which procedure the calculation coordinates are in such a position that the rotor flux ($\Psi_r$) is at least close to the real axis. In the procedure of the invention, the absolute value of the stator flux ($|\Psi_s|$) is regulated by means of the real part ($u_{sr}$) of the stator voltage and the torque (M) by means of the stator frequency ($f_s$). The calculation coordinates are held in said position by adjusting the imaginary part ($u_{si}$) of the stator voltage.

10 Claims, 6 Drawing Sheets

PROCEDURE FOR THE REGULATION OF AN ASYNCHRONOUS MOTOR

BACKGROUND OF THE INVENTION

FIELD OF THE INVENTION

The present invention relates to a method for the regulation of an asynchronous motor by vector control in an imaginary space vector coordinate system.

Today, many electric motor drives use a frequency controlled a.c. motor. With frequency control, the motor efficiency remains high over the whole speed range and the mains power ratio is almost 1. Moreover, the motor used may be a simple squirrel-cage motor.

In the regulation of an asynchronous motor, equivalent circuits representing the motor may be used. For example, an equivalent circuit applicable in asynchronous motor regulation systems is found in figures 2.20 d) and 2.21 in Bühler's book "Einführung in die Theorie geregelter Drehstromantriebe, Band 1: Grundlagen", 1977, which presents a uniaxial, complex equivalent circuit for the stator and rotor of an asynchronous motor in a coordinate system rotating at the angular velocity of the stator. Also, the same book presents the voltage and flux equations for the asynchronous motor in the coordinate system in question (pp 94, equations 2.99 a–d).

Especially in frequency converter drives, the regulation of asynchronous motors is implemented using vector control. An advantage of vector control is that it allows the regulation of d.c. components. This obviates the need to provide each phase of a three-phase motor with a separate regulation arrangement. The book "Steuerverfahren für Drehstrommaschinen", 1983, by Späth, describes the regulation of an asynchronous motor, especially a squirrel-cage motor, in a coordinate system tied to a space vector. On pages 6–33, this book presents a simple model of an asynchronous motor, in which the real axis is oriented in the same direction as the rotor flux vector. In addition, regulation systems are known which are based on the use of current regulators and which can be used in the rotor flux oriented regulation referred to. In such systems, the current has to be measured, and this makes them expensive and complex.

SUMMARY OF THE INVENTION

The object of the present invention is to reduce the drawbacks of the previously known techniques and to achieve a simple procedure for the regulation of the flux and torque of an asynchronous motor by vector control.

In the procedure of the invention, no current regulators are needed. Therefore, the invention provides a regulation system that is faster, simpler and less expensive than the solutions currently used.

Accordingly, a method is provided for regulating the stator flux and torque of an asynchronous motor by vector control in an imaginary space vector coordinate system, having a real and an imaginary axes in which procedure the absolute value of the stator flux ($|\underline{\Psi}_s|$) and the torque (M) are determined in said coordinate system, and in which procedure calculation coordinates are in such a position that the rotor flux ($\underline{\Psi}_r$) vector is at least close to the real axis, wherein the absolute value of the stator flux ($|\underline{\Psi}_s|$) is regulated by means of the real part ($u_{sr}$) of the stator voltage and the torque (M) is regulated by means of the stator frequency ($f_s$); and the calculation coordinates are held in said position by adjusting the imaginary part ($u_{si}$) of the stator voltage.

BRIEF DESCRIPTION OF THE DRAWINGS

In the following, the invention is described in detail by the aid of an example with reference to the drawings attached, in which.

DESCRIPTION OF THE PREFERRED EMBODIMENT

Figure 1:
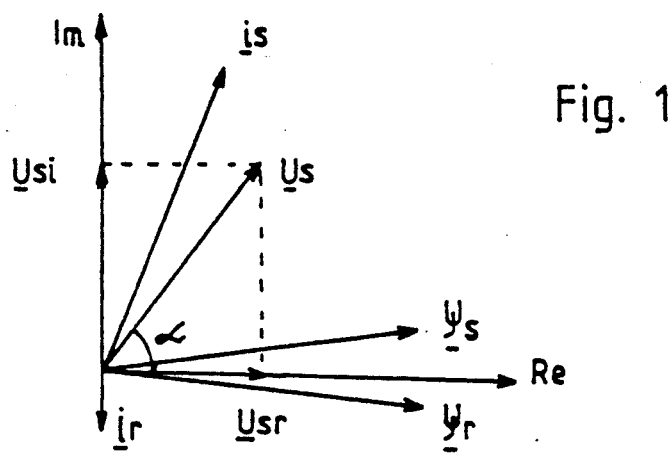
FIG. 1 illustrates a space vector diagram of a squirrel-cage motor.

According to the above-mentioned equations 2.99 a–d, the voltage and flux equations for a squirrel-cage motor, based on the uniaxial theory, in a coordinate system rotating with the stator field (the rotor voltage is zero; the underlined quantities are vector quantities) are as follows:

$$\underline{u}_s = \underline{i}_s r_s + 1/w_m \cdot d\underline{\Psi}_s/dt + jf_s \underline{\Psi}_s \quad (1)$$

$$0 = \underline{i}_r r_r + 1/w_m \cdot d\underline{\Psi}_r/dt + jf_r \underline{\Psi}_r \quad (2)$$

$$\underline{\Psi}_s = \underline{i}_s x_s + \underline{i}_r x_h \quad (3)$$

$$\underline{\Psi}_r = \underline{i}_r x_r + \underline{i}_s x_h \quad (4)$$

In these equations, $u_s$ is stator voltage, $i_s$ stator current, $r_s$ stator resistance, $w_m$ angular frequency, $\Psi_s$ stator flux and $f_s$ stator frequency. Similarly $i_r$ is rotor current, $r_r$ rotor resistance, $\Psi_r$ rotor flux and $f_r$ rotor frequency (slip), $x_s$ is stator reactance, $x_h$ mutual reactance and $x_r$ rotor reactance.

FIG. 1 shows a vector diagram according to the above equations, in which the rotor flux $\underline{\Psi}_r$ is placed, in accordance with what was presented above, on the real axis Re (slightly below the real axis), and in which the stator flux $\underline{\Psi}_s$ is placed slightly above the real axis. The stator voltage $u_s$ is projected on the real and imaginary axes Re and Im as voltage vectors $u_{sr}$ and $u_{si}$.

In the procedure of the invention, the absolute value of the stator flux, which is kept constant as far as possible, is regulated by means of the real part $u_{sr}$ of the stator voltage and the torque by means of the stator frequency $f_s$. By adjusting the imaginary part of the stator voltage, the calculation coordinates are held in a position which allows the rotor flux to remain close to the real axis. The value of the torque and the absolute value of the stator flux are obtained by calculation from the motor equations. The absolute value of the stator flux and the torque are regulated by means of PI controllers whose time constants follow the indicated values.

For the imaginary part $u_{si}$ of the stator voltage, the following equation can be obtained for the regulation:

$$\underline{u}_{si} = k \cdot f_r + f_s \quad (5)$$

where k is the coefficient $r_s \cdot x_h / (r_r \cdot x_x)$. The motor torque T can be written for the regulation (see Bühler, pp. 92) as:

$$t = \text{Im}\{\underline{\Psi}_r^* i_r\} \quad (6)$$

where $\underline{\Psi}_r^*$ is the complex conjugate of the rotor flux vector.

Figure 2:
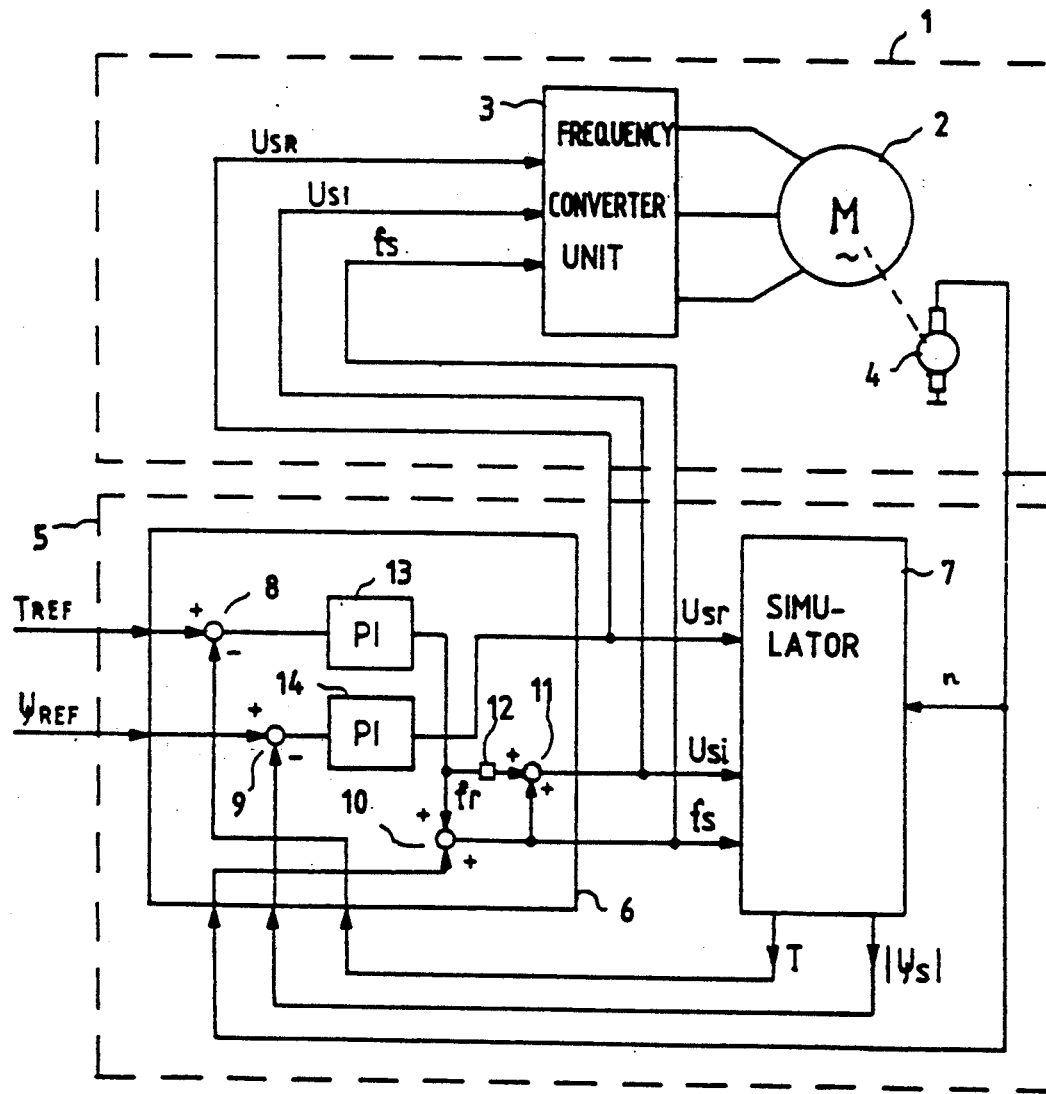
FIG. 2 shows a block diagram of a regulation system of an embodiment of the invention.

FIG. 2 shows a regulation system based on the above equations as applied to a squirrel-cage motor drive fed by a frequency converter. The apparatus 1 comprises a three-phase squirrel-cage motor 2, a frequency converter 3 feeding it, and a tachometer generator 4 connected to the motor shaft to measure the speed of rotation n of the motor. The computer 5 contains a system for flux and torque regulation by the procedure of the invention, implemented by programming means. FIG. 2 shows a block diagram representing a controller 6 and a simulator 7 holding a control algorithm containing regulation equations (5) and (6), respectively. The controller contains differential circuits 8 and 9, summing circuits 10 and 11, and PI controllers 13 and 14.

The reference values Tref and Ψref for the absolute values of the torque and stator flux, obtained from a speed controller, are passed into the controller 6, in which the differential circuits 8 and 9 subtract the torque and flux values T and $|\underline{\Psi}_s|$ (absolute value of stator flux) determined by the simulator 7 from said reference values. Each of these two differences is fed into a PI controller 13 and 14, respectively, the former of which provides the rotor frequency $f_r$. This is added to the motor speed n by the summer 10, which thus provides the stator frequency $f_s$. Moreover, the rotor frequency is combined with the stator frequency via the coefficient k (element 12), thus providing the imaginary part $u_{si}$ of the stator voltage. The other controller 14 provides the real part $u_{sr}$ of the stator voltage. These three quantities, $u_{si}$, $u_{sr}$ and $f_s$, are fed into the simulator 7, which provides the torque T and flux $|\underline{\Psi}_s|$ as stated above, and also into the frequency converter 3. The PI controller time constant is $$\tau = (r_s x_r + r_r x_s)/(w_m \cdot r_r \cdot r_s)..$$

Figure 3:
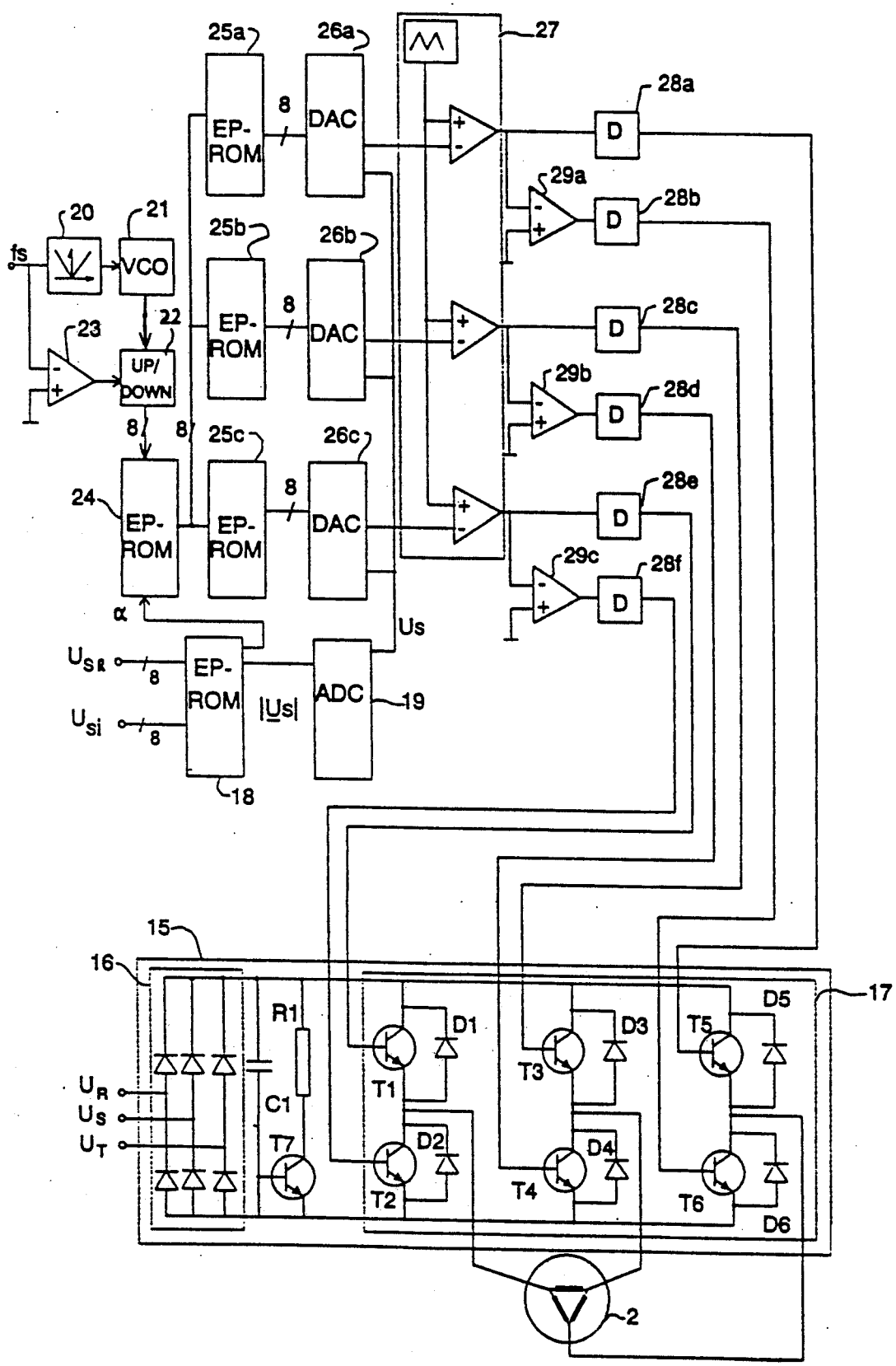
FIG. 3 illustrates the block diagram of the frequency converter unit represented in FIG. 2, showing the use of the regulation system of the invention in the control of the squirrel cage motor.

FIG. 3 gives a more detailed illustration of the power stage and control of a frequency converter applied in the regulation procedure of the invention. The power stage 15 of the frequency converter, which is fed from a three-phase mains network having phase voltages $U_R$, $U_S$ and $U_T$, feeds the motor 2. The power stage of the frequency converter consists of a diode rectifier bridge 16, an inverter power stage 17, a filtering capacitor C1, and a resistor R1 and a transistor T7 serving to handle the returning motor power.

The inverter power stage 17 consists of transistors T1-T6 and diodes D1-D6, which form the paths for the inductive currents. The transistors are controlled as follows:

The imaginary $u_{si}$ and real $u_{sr}$ parts of the stator voltage are first input to an EPROM circuit 18, whose outputs provide the amplitude $|U_s|$ and angle $\alpha$ of the stator voltage. The stator voltage amplitude is converted into digital form $U_s$ by an A/D converter 19. The frequency $f_s$ of the stator voltage is first input to an absolute value generator 20 to produce its absolute value. Next, the signal is fed into a voltage-controlled oscillator 21, whose output provides a square wave of a frequency proportional to the stator voltage frequency $f_s$. The square wave obtained from the oscillator is fed into an up/down counter 22, whose counting direction is determined by a comparator 23 which follows the stator voltage polarity.

This signal is added to the angle signal $\alpha$ in a memory circuit 24. The eight-bit address signal thus obtained is applied to the inputs of three memory circuits 25a-25c containing the curves representing the reference voltages of each phase. At the outputs of these circuits, the signals are present as a digital word in parallel form. The binary signals are then fed into digital-to-analog converters 26a-26c, in which the voltages are converted into analog form and their amplitudes are adjusted to a value corresponding to the voltage $U_s$. At the outputs of the D/A converters is a three-phase voltage of variable amplitude and frequency. This voltage is used to control a pulse-width modulator 27 consisting of a triangular wave generator and comparators. The output voltages of the pulse-width modulator are obtained by comparing the triangular voltage provided by the triangular wave generator with the signals obtained from the digital-to-analog converters. The output voltages are fed into drivers 28a-28f controlling the transistors T1-T6. One (e.g. T2) of the transistors at each pole in the power stage 17 is controlled via comparators 29a-29c by the complementary signal of the other transistor (e.g. T1).

Figure 4A:
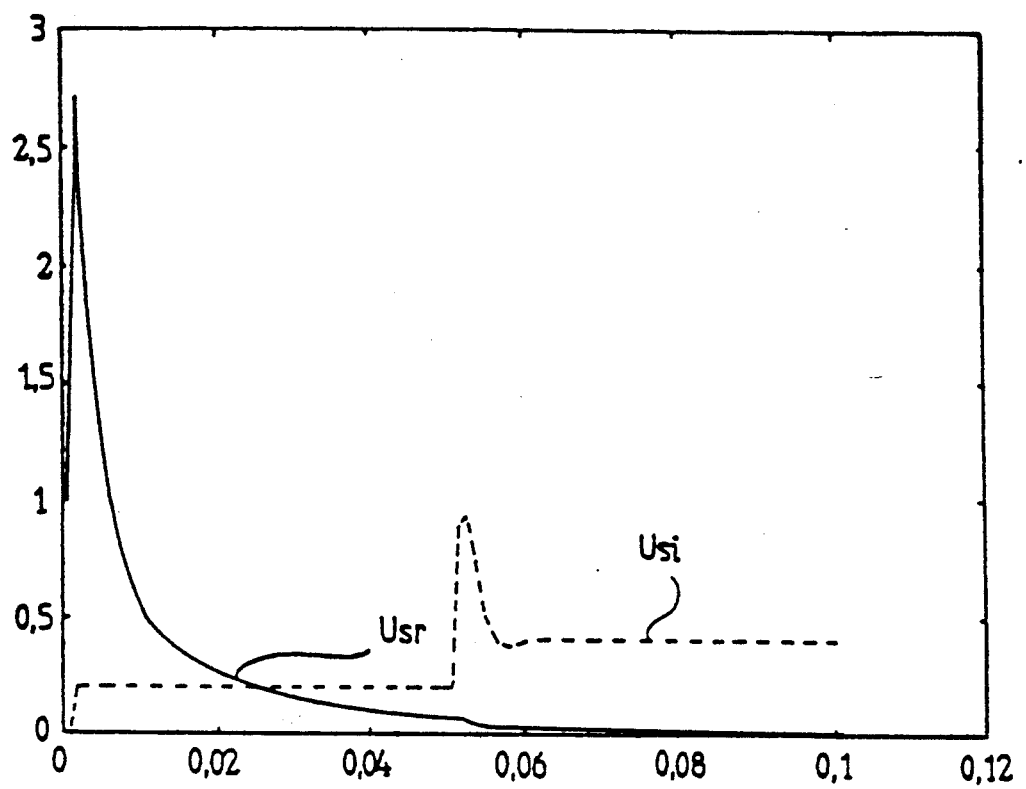
FIGS. 4a–4g illustrate motor simulation curves.
Figure 4B:
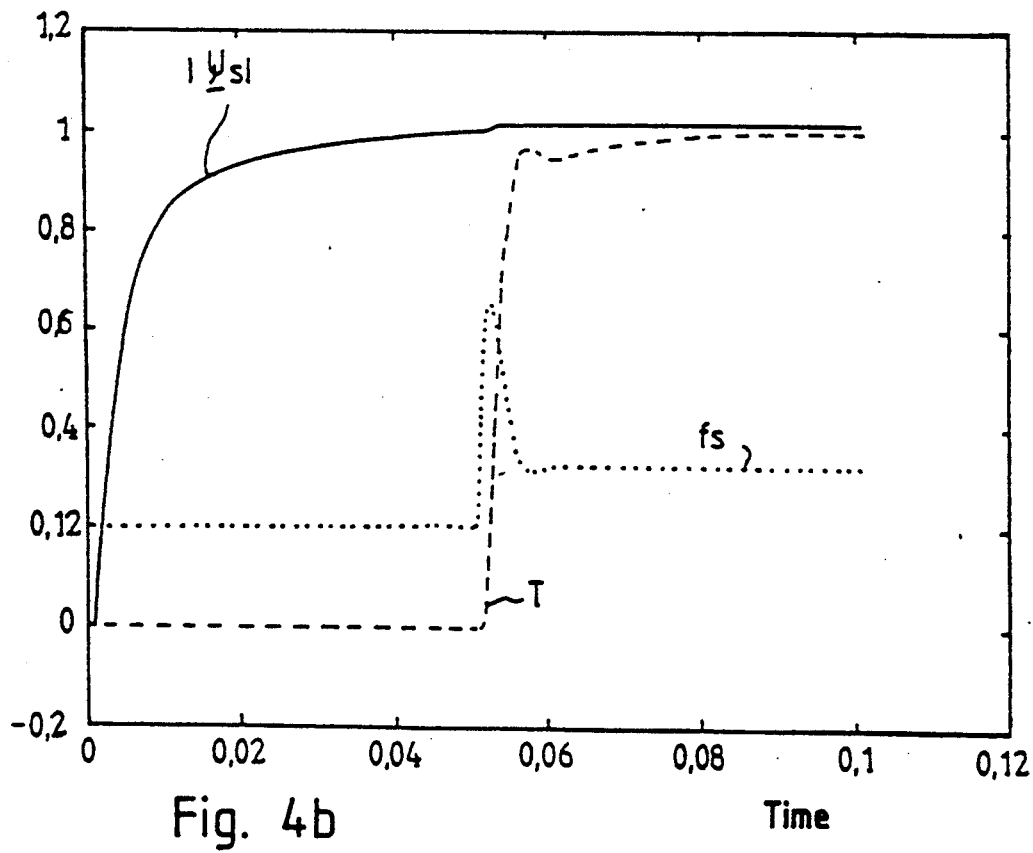
Figure 4C:
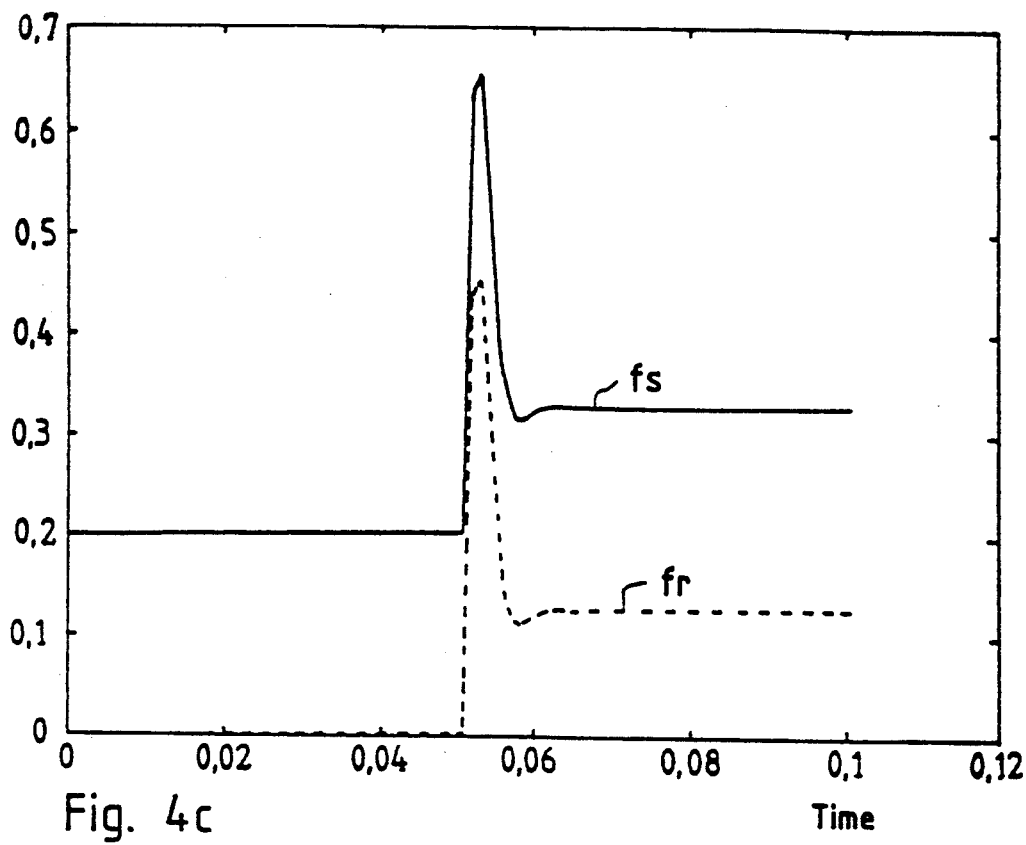
Figure 4D:
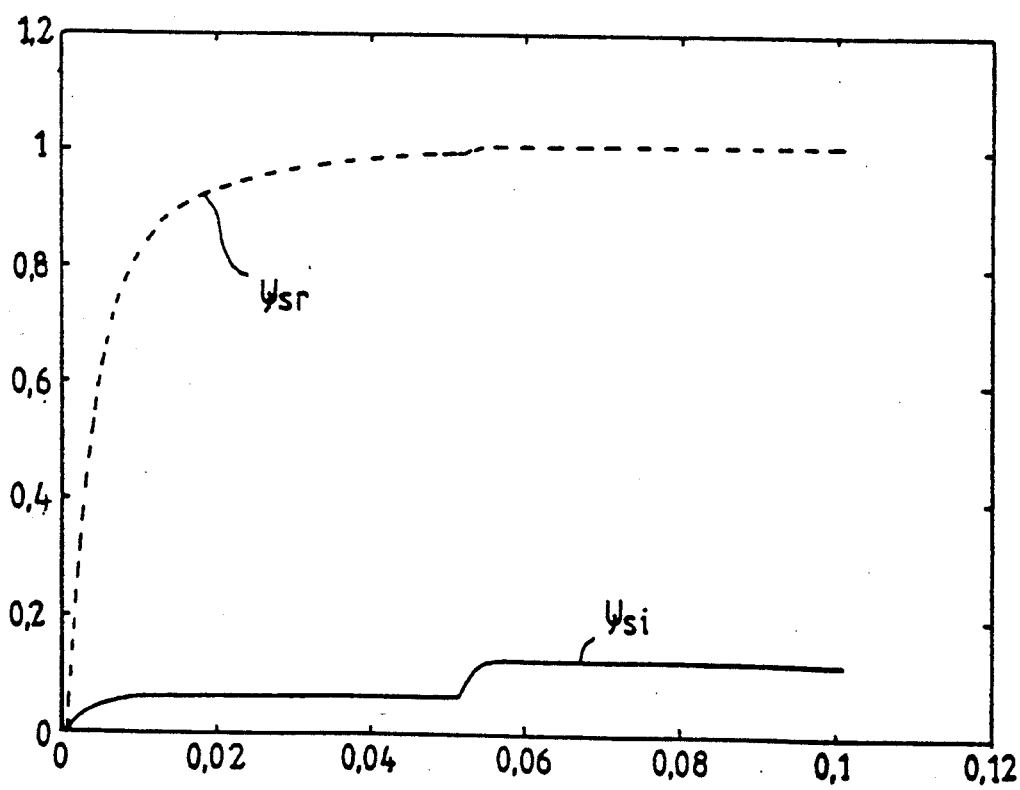
Figure 4E:
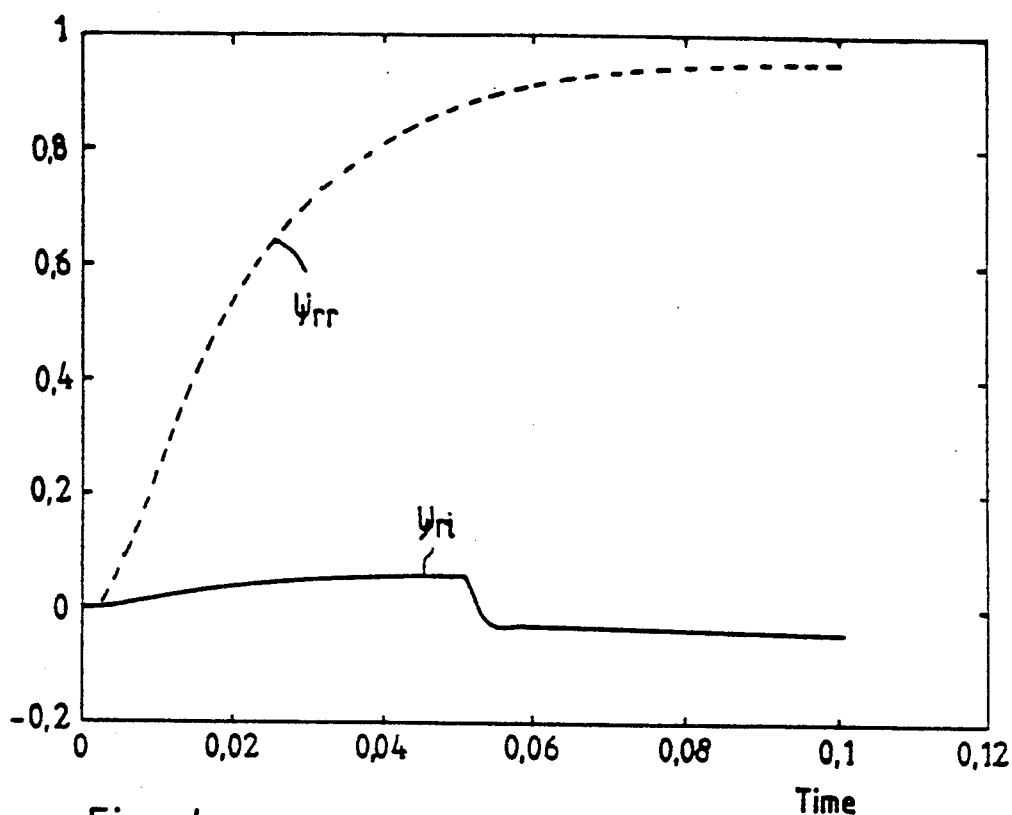
Figure 4F:
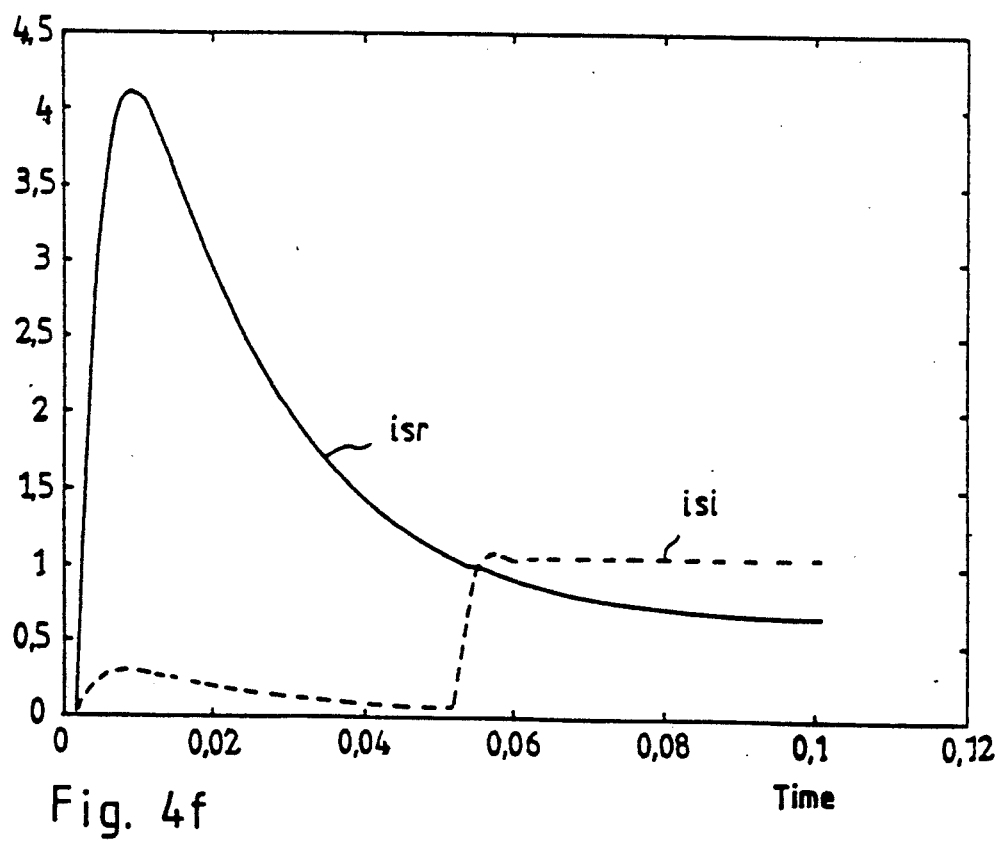
Figure 4G:
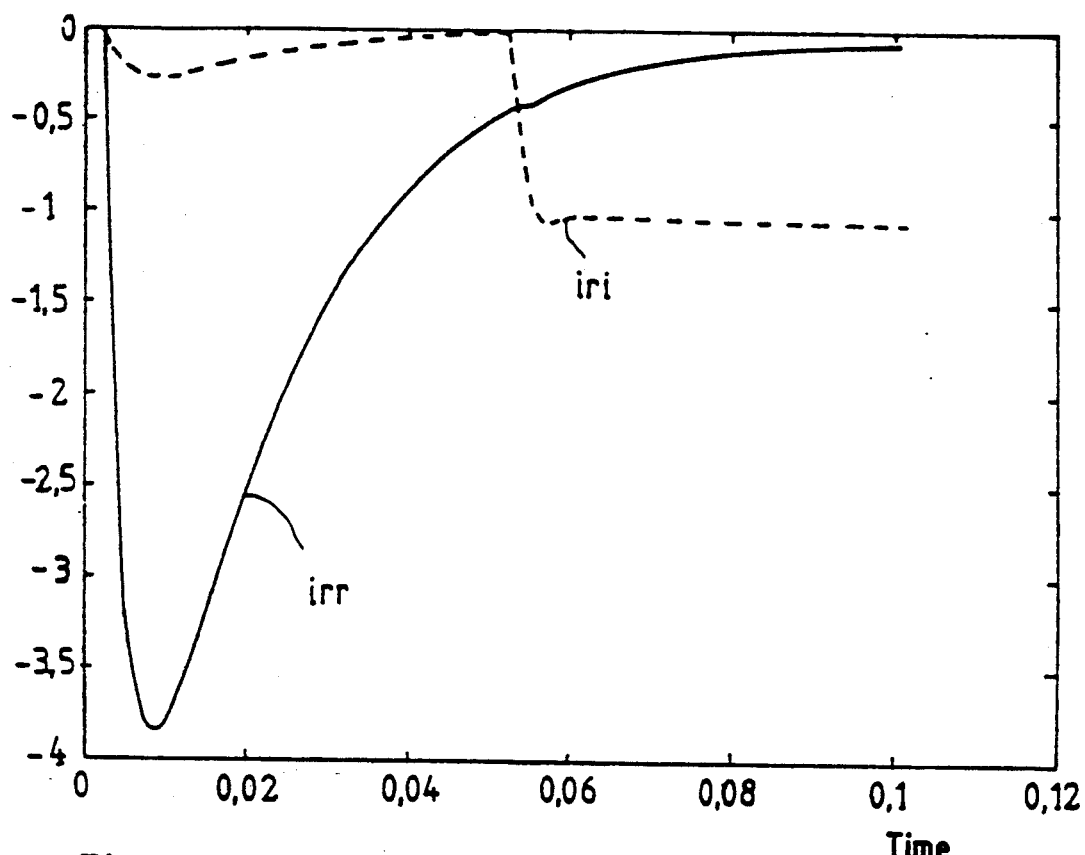

FIG. 4a illustrates the real $u_{sr}$ and imaginary $u_{si}$ parts of the stator voltage by means of the simulation model, as functions of time, FIG. 4b the absolute value $|\underline{\Psi}_s|$ of the stator flux, the stator frequency $f_s$ and the step response of the torque T, FIG. 4c the rotor and stator frequencies $f_r$, $f_s$, FIG. 4d the real and imaginary parts $\Psi_{sr}$, $\Psi_{si}$ of the stator flux, FIG. 4e the real and imaginary parts $\Psi_{rr}$, $\Psi_{ri}$ of the rotor flux, FIG. 4f the real and imaginary parts $\Psi_{rr}$, $\Psi_{si}$ of the stator current and FIG. 4g the real and imaginary parts $i_{rr}$, $i_{ri}$ of the rotor current.

It is obvious to a person skilled in the art that different embodiments of the invention are not restricted to the example described above, but that they may instead be varied within the scope of the following claims.

I claim:

1. A method for regulating a stator flux and torque of an asynchronous motor by vector control in an imaginary space vector coordinate system, having a real and an imaginary axis, said method comprising the steps:
   a) selecting said imaginary space vector coordinate system to have a relative position such that a rotor flux vector ($\underline{\Psi}_r$) is at least close to the real axis;
   b) generating a simulated absolute value of a stator flux ($|\Psi_s|$) and torque (T) determined in said coordinate system and processing said simulate stator flux and said torque for obtaining a real ($u_{sr}$) and an imaginary ($u_{si}$) part of a stator voltage and stator frequency (fs);
   c) regulating the absolute value of the stator flux ($|\Psi_s|$) by means of the real part ($u_{sr}$) of the stator voltage vector and regulating the torque (T) by means of the stator frequency (fs); and
   d) holding said coordinate system in said relative position by adjusting the imaginary part ($u_{si}$) of the stator voltage vector.

2. A method according to claim 1, wherein said coordinate system rotates with the stator.

3. A method according to claim 1, wherein the absolute value of the stator flux remains constant.

4. A method according to claim 2, wherein the absolute value of the stator flux remains constant.

5. A method according to claim 1, wherein the absolute value of the stator flux and the torque are regulated by means of a PI controller whose time constant is selected according to the motor electrical parameters.

6. A method according to claim 1, for the regulation of an asynchronous motor controlled by a frequency converter, in which method step b) comprises measuring the speed of rotation (n) of the motor generating the torque (T) and the absolute value of the stator flux ($|\underline{\Psi}_s|$) in said coordinate system, in a simulator and step c) comprises the following sub-steps: (c1) setting a reference value (Tref) for the simulated torque and a reference flux (Ψref) for the absolute values of the stator flux;

(c2) subtracting the simulated torque (T) obtained from said simulator from the reference torque value ($T_{ref}$) and feeding the difference into a first PI controller; the output of said first PI controller providing the rotor frequency ($f_r$); forming the stator frequency ($f_s$) by summing the rotor frequency with the rotational speed (n) of the motor; and the imaginary part ($u_{si}$) of the stator voltage being obtained by combining the stator frequency with a coefficient (k) dependent on the motor impedances;

(c3) subtracting the absolute value of the simulated stator flux ($|\underline{\Psi}_s|$) obtained from said simulator from the reference value of the stator flux ($\Psi_{ref}$) and feeding the difference into a second PI controller; and the output of the second PI controller giving the real part ($u_{sr}$) of the stator voltage, and (c4) applying the imaginary and real parts ($u_{si}$, $u_{sr}$) of the stator voltage as well as the stator frequency ($f_s$) to said frequency converter to control solid state switches of inverter part thereof and to said simulator.

7. A method according to claim 4, for the regulation of an asynchronous motor controlled by a frequency converter, in which method step b) comprises measuring the speed of rotation (n) of the motor generating the torque (T) and the absolute value of the stator flux ($|\underline{\Psi}_s|$) in said coordinate system, in a simulator and step c) comprises the following sub-steps: (c1) setting a reference value (Tref) for the simulated torque and a reference flux (Ψref) for the absolute values of the stator flux;

(c2) subtracting the simulated torque (T) obtained from said simulator form the reference torque value ($T_{ref}$) and feeding the difference into a first PI controller; the output of said first PI controller providing the rotor frequency ($f_r$); forming the stator frequency ($f_s$) by summing the rotor frequency with the rotational speed (n) of the motor; and the imaginary part ($u_{si}$) of the stator voltage being obtained by combining the stator frequency with a coefficient (k) dependent on the motor impedances;

(c3) subtracting the absolute value of the simulated stator flux ($|\underline{\Psi}_s|$) obtained form said simulator from the reference value of the stator flux ($\Psi_{ref}$) and feeding the difference into a second PI controller; and the output of the second PI controller giving the real part ($u_{sr}$) of the stator voltage, and (c4) applying the imaginary and real parts ($u_{si}$, $u_{sr}$) of the stator voltage as well as the stator frequency ($f_s$) to said frequency converter to control solid state switches of inverter part thereof and to said simulator.

8. A method according to claim 1, for the regulation of a motor controlled by a pulse-width modulated frequency converter, in which control signals for the solid-state switches are generated via pulse-width modulation by comparing a modulation signal with a modulating signal, wherein the frequency of the modulating signal for pulse-width modulation is determined on the basis of the stator frequency and the angle ($\alpha$) of the stator voltage vector while the amplitude of the modulating signal is determined on the basis of the absolute value ($U_s$) of the stator voltage.

9. A method according to claim 7, for the regulation of a motor controlled by a pulse-width modulated frequency converter, in which control signals for the solid-state switches are generated via pulse-width modulation by comparing a modulation signal with a modulating signal, wherein the frequency of the modulating signal for pulse-width modulation is determined on the basis of the stator frequency and the angle ($\alpha$) of the stator voltage vector while the amplitude of the modulation signal is determined n the basis of the absolute value ($U_s$) of the stator voltage.

10. Method according to claim 1, wherein the motor is a squirrel-cage motor.

* * * * *